US010328327B2

(12) United States Patent
Porter et al.

(10) Patent No.: US 10,328,327 B2
(45) Date of Patent: Jun. 25, 2019

(54) GOLF GAME REWARD SYSTEM AND METHOD

(71) Applicant: 10&8, La Puente, CA (US)

(72) Inventors: Tom Porter, Yorba Linda, CA (US); Dallas Mix, Manteca, CA (US); Robert Forsberg, Diablo Grande, CA (US); Raymond E. Poliquin, City of Industry, CA (US)

(73) Assignee: 10&8, La Puente, CA (US)

( * ) Notice: Subject to any disclaimer, the term of this patent is extended or adjusted under 35 U.S.C. 154(b) by 396 days.

(21) Appl. No.: 15/410,516

(22) Filed: Jan. 19, 2017

(65) Prior Publication Data

US 2017/0128815 A1  May 11, 2017

Related U.S. Application Data

(62) Division of application No. 14/561,434, filed on Dec. 5, 2014, now abandoned.

(51) Int. Cl.
  *A63B 71/06* (2006.01)
  *G06Q 20/04* (2012.01)
  (Continued)

(52) U.S. Cl.
  CPC ......... *A63B 71/0616* (2013.01); *G06Q 20/04* (2013.01); *G06Q 20/102* (2013.01);
  (Continued)

(58) Field of Classification Search
  CPC .. G06K 19/0725; G06K 7/10366; H04Q 5/22; A63B 69/36; A63B 71/0605; G04F 8/08
  See application file for complete search history.

(56) References Cited

U.S. PATENT DOCUMENTS 5,102,140 A  4/1992 Vincent
5,423,549 A  6/1995 Englmeier
(Continued)

FOREIGN PATENT DOCUMENTS

KR     101240502 B1    3/2013
WO  WO1998051384 A1  11/1998
WO  WO2009092140 A1   7/2009

OTHER PUBLICATIONS

Written Opinion from ISA for parent application of PCT/US15/63660.
(Continued)

*Primary Examiner* — Reginald A Renwick
(74) *Attorney, Agent, or Firm* — Trojan Law Offices

(57) ABSTRACT

The present invention is directed to a system and method for administering a hole-in-one contest. Upon receiving payment, an identification code is transmitted to the golfer, and a video recording is made of the following events: 1) the player writing the identification code on the ball, 2) the player hitting the ball toward the green, 3) the ball's flight path toward the green, 4) retrieval of the ball from the cup, and 5) a close-up view of the ball showing the same identifying code that was placed on the ball earlier. The video recording is transmitted to a server where it is authenticated and verified. If the hole-in-one is verified, the player is awarded a prize. The system includes a player device, a video recording device (which may be integrated with the player device), a transmitter unit, a receiver unit, and a server.

17 Claims, 3 Drawing Sheets

(51) Int. Cl.
- *H04N 5/91* (2006.01)
- *H04N 5/77* (2006.01)
- *G07F 17/32* (2006.01)
- *G06Q 20/10* (2012.01)

(52) U.S. Cl.
CPC ............... *G07F 17/32* (2013.01); *H04N 5/77* (2013.01); *H04N 5/91* (2013.01)

(56) References Cited

U.S. PATENT DOCUMENTS

| | | | | |
|---|---|---|---|---|
| 5,511,045 | A | * | 4/1996 | Sasaki ........................ G04F 8/08 340/323 R |
| 5,884,913 | A | | 3/1999 | Cohen |
| 6,974,391 | B2 | | 12/2005 | Ainsworth |
| 8,439,766 | B1 | | 5/2013 | Brown |
| 9,604,142 | B2 | * | 3/2017 | Bentley ................... A63F 13/06 |
| 2001/0021673 | A1 | | 9/2001 | Cleveland |
| 2003/0004005 | A1 | | 1/2003 | Ainsworth |
| 2005/0250590 | A1 | | 11/2005 | Doaga |
| 2006/0084529 | A1 | | 4/2006 | Burkons |
| 2006/0166734 | A1 | | 7/2006 | Gaites |
| 2010/0230946 | A1 | * | 9/2010 | Kanda ................ B42D 15/0093 283/85 |
| 2011/0034223 | A1 | | 2/2011 | O'Leary |
| 2011/0230245 | A1 | | 9/2011 | Carr |
| 2014/0095291 | A1 | | 4/2014 | Dey |
| 2016/0259952 | A1 | * | 9/2016 | Van Rens ........ G06K 19/07766 |

OTHER PUBLICATIONS

First Office Action of Parent U.S. Appl. No. 14/561,434.
Volvik http://www.volvik.com/hole-in-one (screen shots attached); Cited in parent application.
Youtube video of swinging a club to hit a golf ball; https://youtu.be/PvfwnQ2jUx4.

* cited by examiner

GOLF GAME REWARD SYSTEM AND METHOD

CROSS-REFERENCE TO RELATED APPLICATIONS

This application is a divisional of U.S. patent application Ser. No. 14/561,434 filed Dec. 5, 2015.

FIELD OF THE DISCLOSURE

The present invention relates to a system and method for administering a contest. More specifically, the system and method relate to administering a hole-in-one golf contest.

BACKGROUND OF THE INVENTION

In the game of golf, a hole-in-one is an extremely exciting and rare event. The odds of making a hole-in-one have been estimated to be between 2,500 to 1 for a professional golfer to 12,500 to 1 for an average golfer. The excitement of making a hole-in-one make it suitable for various types of contests. Large cash and prize awards are often given to golfers who can accomplish this feat during regular play of a golf tournament, or during special hole-in-one contests.

In some competitions, the competitors are automatically entered in a hole-in-one contest as part of their entrance fee to the general golf competition. In other types of hole-in-one contests, the only contest is actually making a hole-in-one for a particular hole, but it is not during a full round of play. Due to the excitement of making a hole-in-one, golfers may want to partake in a prize-offered hole-in-one contest even if no official contest is being offered at a nearby golf course.

Hole-in-one contests for large prizes would bring added excitement to a game when golfers are just playing socially with each other. However, there are challenges to administering a hole-in-one contest for prizes during a game amongst friends. Foremost is that there is no objective observer to verify that a hole-in-one was actually made. There have been several attempts to create systems and methods to administer a hole-in-one contest when there is no official observer to verify the hole-in-one. These systems and methods all have various shortcomings. Some of these systems and methods for administering a hole-in-one contest include the following:

In U.S. Patent Pub. No. 20110034223A1 to O'Leary et al., O'Leary discloses a golf course that has a kiosk and numerous cameras stationed throughout the golf course. Some cameras are positioned view the tee, while others are positioned to view the greens and the cup. The player can enter a hole-in-one contest by initiating payment at a kiosk, which then turns on cameras stationed about the hole. The recorded event can be verified by a third party and the hole-in-one is verified.

In U.S. Patent Pub. No. 20060084529A1 to Burkons, Burkons discloses a system and method for administering a golf contest where a player is entered into a contest after purchasing an item (such a bag of golf balls), without separately paying to enter a contest. The system uses several cameras stationed about a golf course, which record the event, and the event is verified by a third party across a wired or wireless network.

In U.S. Patent Pub. No. 20010021673 to Cleveland, Cleveland discloses a hole-in-one video registration system. The registration system includes a system for the collection and pay-out of funds donated to charities, and for tracking and auditing transactions to deter and eliminate fraudulent activities. The system also uses at least two cameras, one showing the tee, and the other showing the cup.

In U.S. Pat. No. 6,974,391 to Ainsworth, Ainsworth discloses a method and apparatus for uniquely identifying a golf ball at a target. The apparatus includes a ball vending machine that can uniquely mark a ball to identify a golfer. The apparatus also includes a ball collector that can detect the ball specifically coded for the golfer. A camera monitors the target and ball detection/ID assembly. The balls may have a unique radio frequency tag that identifies the individual ball. Other patents disclose other means to uniquely identify balls, such as U.S. Pat. No. 5,743,815 to Helderman, which discloses a passive transponder embedded with a ball so that the ball can be tracked.

The systems and methods currently used to administer hole-in-one competitions often require pre-installed kiosks and pre-installed video cameras, which may or may not exist at every golf course. Many of the systems and methods involved also require specialized golf balls. Therefore, there remains a need for improved systems and methods to administer a hole-in-one contest.

BRIEF SUMMARY OF THE PRESENT INVENTION

One aspect of the invention is a method for administering a contest. The method has the step of entering a player (i.e. contestant) into a contest upon receiving a request by the player to initiate the contest. The contest involves accomplishing an objective using a sports object. A unique identification code is generated and transmitted to the player in the contest. The player transmits a video recording of the sports objective within a predetermined amount of time after the unique identification code is transmitted to the player. When the player records the sports objective, he or she shows the unique identification code on the sports object both before attempting the objective and after accomplishing the objective. The video recording is transmitted by the player and received by a server. The sports objective that has been recorded, transmitted, and received is then verified by reviewing the recording. The player is awarded a prize for accomplishing the sports objective once the objective has been verified. The method may include causing at least one computer processor to execute a plurality of instructions to perform one or more of the steps involved.

In one aspect of the invention, the objective of the contest is accomplishing a hole-in-one on a par-three golf hole. The player is entered into the contest upon receiving a request by the player to enter the contest by making a payment through a smartphone or other wireless device. After payment, a unique identification code is generated and transmitted to the player's smartphone. The player (or more likely a second player holding the video recording device, i.e. a videographer) initiates a video recording to create a continuous recorded event that shows the following events: 1) placing the unique identifying code on the golf ball, 2) placing the golf ball on the tee, 3) the player hitting the golf ball, 4) the golf ball's flight toward the green, 5) the player reaching into the cup on the green, 6) the player retrieving the golf ball from the cup, and 7) showing a close-up of the unique identifying code on the golf ball after the player retrieves the golf ball from the cup. The events recorded are not limited to the above listed events, nor is every event listed above required to be documented on the video recording in order to receive a prize. The video recording is transmitted to a server and stored on a storage device. The hole-in-one is verified after reviewing the video. A prize is awarded to the player if the video recording shows that the player made a hole-in-one.

The present invention also provides a system for administering a contest, such as a hole-in-one golf contest. The system includes a player device (such as a smartphone) that has a transmitter unit and a receiver unit. The system also includes a video recording device adapted to wirelessly transmit a video recording. The video recording device may be integrated with the player device, such as a smartphone that has numerous features, including the capability to record, receive, and transmit data. The system also includes a player application linked to the player device (such as an app on a smartphone), the player application being operable to request and receive a unique identifying code. The system also includes a server for conducting the contest. The server has a storage mechanism to store the video recording of the event. The system also includes a server application (software) being operable to generate and transmit a unique identifying code or other type of distinctive marking upon a request by the player. The server is operable to receive a video recording from the video recording device. In order for a prize to be awarded to the player, the video recording should show the unique identifying code on the golf ball before and after the hole-in-one attempt.

The present invention is not necessarily tied to the particular sport of golf or a hole-in-one contest, and the same system and methods may be used to administer contests for a variety of other sports, such as, but not limited to: basketball, football, hockey, archery, or baseball. Sports that use objects where a number can be written on the object itself are especially conducive for the methods and systems for administering the contest described in this application.

DETAILED DESCRIPTION OF EMBODIMENTS

Figure 1:
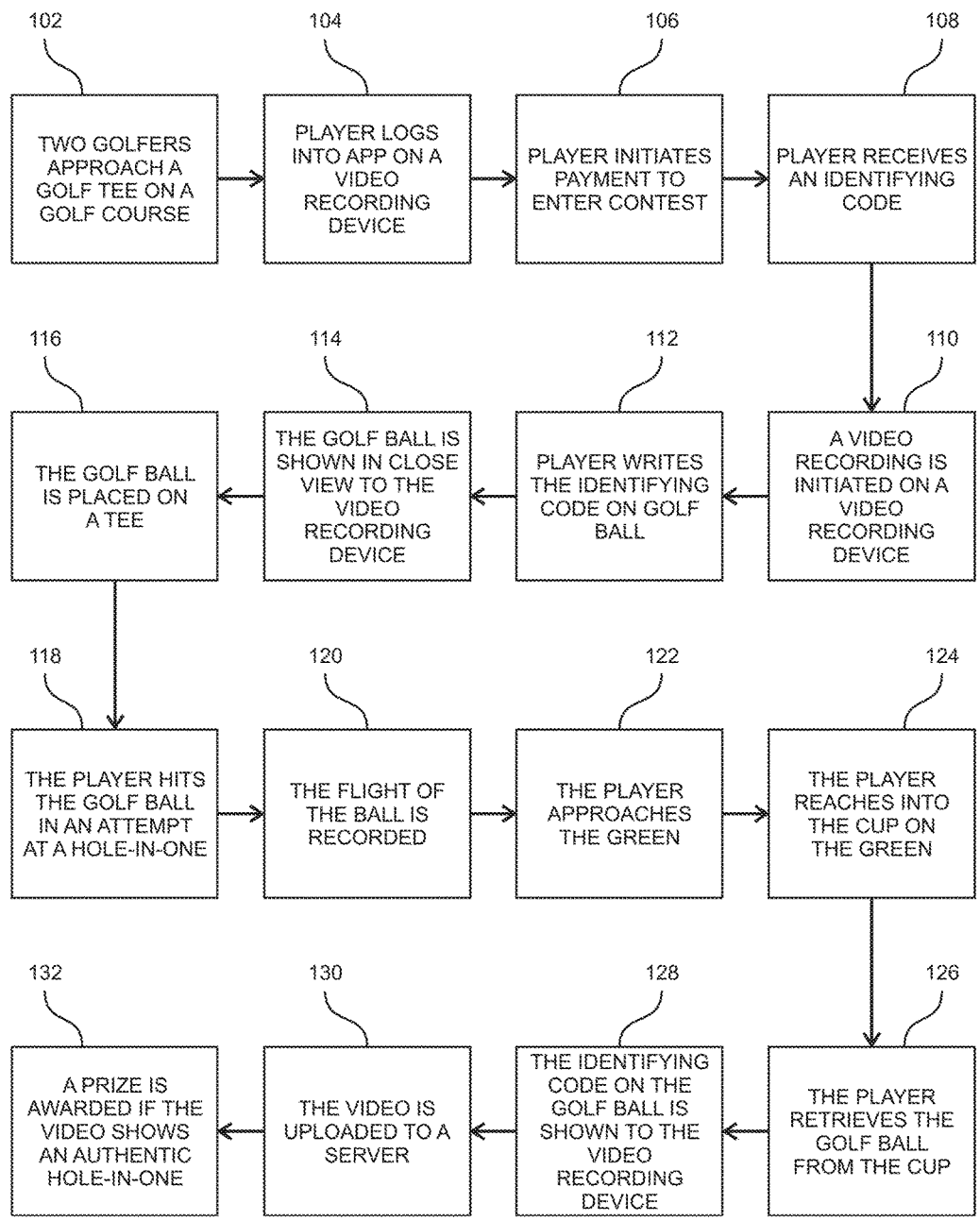
FIG. 1 is a flowchart illustrating the manner in which a player may claim a hole-in-one prize in accordance with the present invention.
Figure 2:
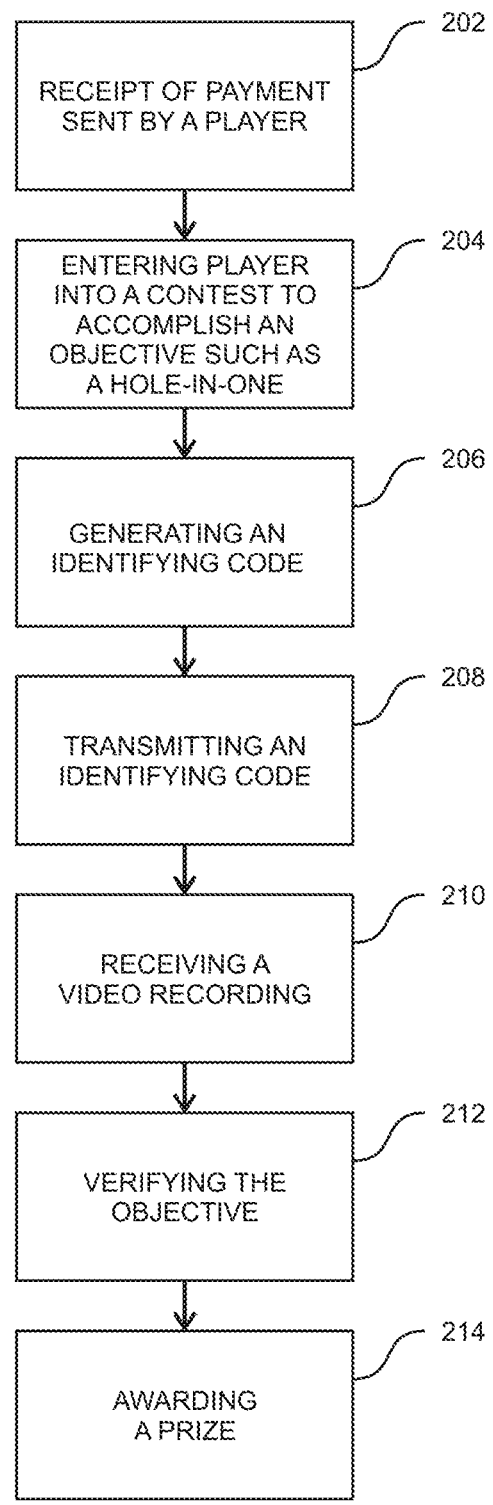
FIG. 2 is a flowchart illustrating the manner in which a system executes the overall process of the present invention.
Figure 3:
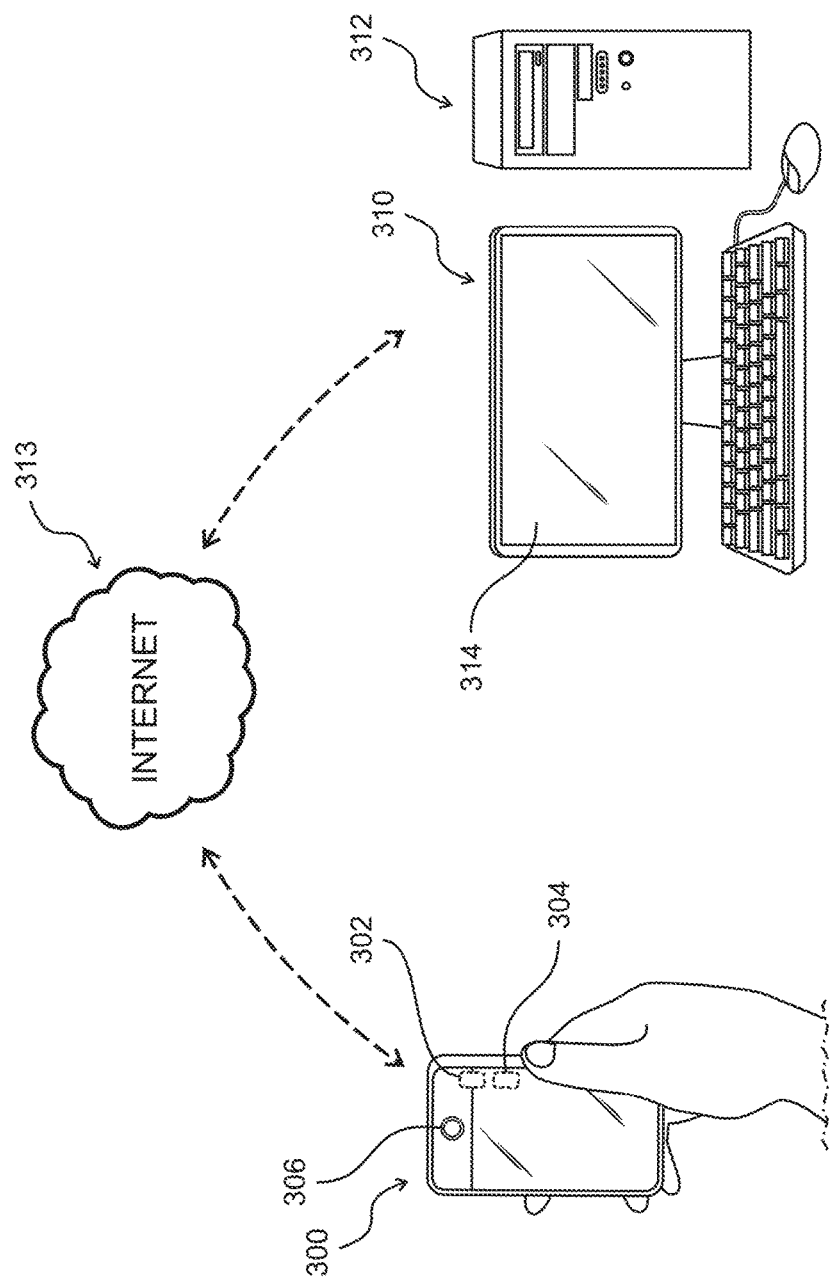
FIG. 3 is a diagrammic view of a system incorporating the invention.

The following discussion addresses a number of embodiments and applications of the present disclosure. Reference is made to the accompanying flowcharts and drawings that form a part hereof, and are shown by way of illustration of specific embodiments in which the disclosure may be practiced. The beneficial features of the present disclosure will be evident from the described embodiments. It is to be understood that the present disclosure is not limited to such specific applications and that numerous implementations of the present disclosure may be realized. All references to patents, patent applications, and non-patent publications mentioned in the specification are hereby incorporated by reference, in their entireties.

In one embodiment of the invention, a method of administering a contest is disclosed. In particular, the method is for administering a hole-in-one golf contest. A player downloads a smartphone app for a hole-in-one contest, registers, and agrees to the Terms and Conditions of the contest. The Terms and Condition will define the qualifying holes eligible for the contest. Downloading and registering may be done at any time, and not necessarily immediately prior to attempting a hole-in-one.

On the golf course, at least two golfers (a contestant and a videographer) approach a golf hole 102. Preferably, the hole should be a par-three hole of at least 120 yards so that a hole-in-one is difficult, but not impossible. Preferably, the hole should be visible from the tee, but this is not required. One of the golfers logs into the app 104 and initiates the contest by making a payment of a predetermined amount 106. Initiation of payment may be accomplished by entering in a password on the app or by submitting money. The prize may be a set amount, or the prize may be a progressive jackpot that increases until a contestant makes a particular hole-in-one. The player may access the app on the smartphone to check the current amount of the progressive jackpot or to view sponsor prizes. Alternatively, the jackpot may increase if the contestant pays more money to enter the contest. The amount may vary to enter in the contest, but preferred amounts are between $0.99 and $2.00. Once payment is received, the golfer is officially entered into the contest and the app preferably enters into a standby mode until the player presses a "start video" button to begin recording events.

Upon payment of the entry fee via the smartphone or other wireless device, the payment instruction is transmitted to a server that administers the contest, which is connected to an application that runs the contest. When the server receives payment, a processing unit of the server generates a unique identifying code. The unique identifying code may be an alphanumeric consisting of numbers and letters, but may include symbols or other identifying characteristics. Preferably, the unique identifying code should generated via a random number generator and the code should be of a certain length to ensure that each code generated is unique. The unique identifying code is transmitted via a wireless signal to the player's smartphone where the unique identifying code is received 108. The transmittal of the unique identifying code may be through any number of means, such as, but not limited to: an SMS text messaging, an automated voice call, an e-mail, or through a designated app on a phone. In another embodiment, the identifying code may not be unique, but is sufficiently distinctive enough such that it would be difficult for a player to know what to write on the golf ball before receiving the identifying code to write on the golf ball.

After the player receives the unique identifying code, a continuous video recording (which preferably also comprises an audio recording of the events) should be initiated by a second individual by pressing a "start video" button on the screen of the player device in order to record the hole-in-one attempt 110. Preferably, the video recorder will not only record the events, but the recording will be time-stamped and GPS located. The video recording documents several events during the hole-in-one attempt in order to verify whether the player has truly made a hole in one. After receiving the unique identifying code, the second player preferably reads the unique identification code to the first player (contestant), and the contestant writes this code on the golf ball, preferably using a permanent pen 112, though other writing implements may be used. To further ensure that the ball used in the contest is unique, the ball should not be a new golf ball, but should be a used golf ball that has some other distinctive identifying features or markings (e.g. scuff marks, dirt, colorings, etc.) that would be difficult to duplicate on other golf balls.

The video recording should be recorded on a device capable of transmitting video through a wireless medium (e.g. cellular, radio frequency, microwave, infrared, Bluetooth). Preferably, the video recording should be made on a smartphone that has video recording functions, but the recording can be made on non-smartphone devices, such as a standalone video recording device having wireless transmission capabilities. Preferably the contest takes place on a par-three hole and the cup of the hole should be viewable from the tee. The recording should document the following events in a single continuous recording: 1) the contestant placing the unique identifying code on the golf ball 112, 2) the ball shown in close-up to the video recorder (player device) 114 so that the video shows details of the ball and its unique markings, 3) without any appearance of slight of hand, the contestant placing the golf ball on the tee 116, 4) the contestant hitting the golf ball in an attempt to make a hole-in-one 118, 5) the golf ball's flight toward the green of the hole 120, 6) the contestant approaching the green 122, 7) without any appearance of slight of hand, the contestant reaching into the cup on the green 124, 8) the contestant retrieving the golf ball from the cup 126, and 9) a close-up view of the golf ball after the contestant retrieves the golf ball from the cup, the close-up view showing the unique identifying code and/or any other unique features of the golf ball 128. The close-up view after retrieving the golf ball from the cup must show the same markings to prove that it is the same golf ball that was placed on the tee before the hole-in-one attempt.

To further reduce fraud attempts, other events that may be required to receive a prize may include: 1) a requirement to keep the entire recording in focus, 2) a requirement that the contestant must be in the foreground of the video stream and the golf green and/or flagstick always remain visible in the background during the entire recording, and 3) a requirement that the videographer must maintain a continuous and unobstructed video the green and flagstick as the contestant and the videographer travel to the green via a golf cart or on foot.

Once the hole-in-one has been recorded, the videographer stops the video and the app will display a prompt to allow the videographer to submit/transmit the video recording, which allows the video to be uploaded to a server 130. To prevent accidental submission of the video, the app may require a two-step verification before submitting the video. If the prize for the hole-in-one is a jack-pot that increases as more players attempt the hole-in-one, the jackpot amount will be frozen in a "pending mode" during the verification process, and the jackpot will be reset for new players.

To further prevent fraud, the time from the beginning of the recording to uploading the record must take place within a predetermined amount of time, such as less than twenty (20) minutes, but preferably less than ten (10) minutes. The short timeframe to upload a video ensures that a player cannot easily cheat the system by taking video of a non hole-in-one, and then edit the video to make it appear that the player has made a hole-in-one. The video recording can be in any number of formats commonly known in the art (e.g. AVI, MP4, ASF, MOV, WAV, MPEG, MKV, etc.). Alternatively, instead of uploading a file after it has been recorded, the video recording of the event can be live-streamed through the Internet as it is being recorded. A live-stream has an advantage over uploading the recording of the hole-in-one because a live-stream of the hole-in-one event is more difficult to fake or edit compared to a file of a pre-recorded event. The live-stream may be transmitted through an app specific for the hole-in-one game or some other app on the smartphone or recording device that has the capability of live-streaming video.

The video is uploaded by transmitting the video through the Internet, and received by the server. The video recording of the event is reviewed to verify that the player accomplished the hole-in-one. If the reviewer determines that the hole-in-one is authentic, a prize is awarded to the player 132. The prize may be sent electronically to an account of the player, or may be sent by check. The total amount collected through administering the contest may be split amongst various entities, including, but not limited to: 1) the company administering the contest, 2) the company hosting the application that runs the contest (e.g. Apple® or Android®), and 3) the prize winning contestant.

The further ensure the authenticity of the hole-in-one, other verification methods may be employed. For example, an affidavit, declaration or oath may be required by one or more individuals to confirm the accuracy of the hole-in-one video. The affidavit may be filled out within the app itself, or may be a separate affidavit. Individuals may include other golfers in the same party as the contestant, or an employee of the golf course to confirm that the contestant was at the golf course at the time the hole-in-one was made. Information in the affidavit may include details of the time of the hole-in-one, location of the golf course, hole number, distance from the tee to the cup, player contact information, and a declaration that the video is authentic. The verification review of the hole-in-one may be performed by a person or by may be an automated verification system using video enhancement technology and digital screenshot magnification to confirm that the ball traveled from the tee into the cup or appeared in the right direction, and that the ball was correctly marked, identified, hit, tracked, removed from the cup, and re-identified properly without losing sight of the green and flagstick, per the Terms and Conditions.

If the video indicates a hole-in-one, an individual (or automated system) will contact an employee of the pro shop a the course where the contestant is claiming a hole-in one to compare the video time stamp, and GPS location with the information on the affidavit. If the hole-in-one is authentic, the contestant will be contacted via text, e-mail and/or a phone call to arrange for payment and delivery of a prize. An additional requirement to receive a prize may include a requirement that the contestant register his or her hole-in-one with the National Hole-In-One Registry. This may further prevent fraud because golfers may be reluctant to have their name posted publicly for accomplishing a hole-in-one, if in fact they had not.

The app may send an outgoing text or e-mail to other subscribers, congratulating the contestant, detailing the contestant's winnings, and may include an option for the subscribers to view the hole-in-one video.

The system to implement the hole-in-one contest has several components. The system includes a player device 300 having a transmitter unit 302, and a receiver unit 304, such as a smartphone 300. The system also includes a video recording device 306 that is adapted to wirelessly transmit a video recording. The video recording device 306 is optionally integrated within the player device 300, as is common in current smartphone technology. The device has an application linked to the player device 300. The player enters the contest by operating the application to make a payment 204. The application transmits a signal to a server 312 that accepts payment 202. Upon initiating payment, the server 312 generates a unique identifying code 206, and the server transmits 208 to the receiver unit 304 on the player device 300 the unique identifying code. The server 312 comprises a storage mechanism to store the video recording sent by the player device 300. The server 312 has a linked application or software operable to generate a unique identifying code upon request and payment by the player 202. The server is capable of sending the unique identifying code to the player 208, receiving the video recording 210 from the player device, and allowing the video recording to be reviewed and verified 212. The video recording is reviewed on a computer 310 having a monitor 314 that displays the video recording of the hole-in-one. If the hole-in-one is verified, a prize is awarded 214.

In another embodiment of the invention, the player may enter a hole-in-one competition by having a subscription to a hole-in-one contest service. In this embodiment, the player would not need to enter payment for each attempt at a hole-in-one, but would pay for a subscription to a hole-in-one contest, such as a short-term subscription (which may be monthly) or longer-term subscriptions (which may be yearly). Initiating the contest by subscription would allow the player to attempt an unlimited or pre-set maximum number of attempts at a hole-in-one during the subscription period, or an unlimited number of attempts in a predetermined time period, thereby allowing the player to have multiple chances to accomplish the hole-in-one with a single payment. For example, a single payment may allow 10 hole-in-one attempts, or a single payment may allow an unlimited number of attempts in a given month. With the subscription model, entering the contest would not necessarily be initiated by a payment immediately before attempting the hole-in-one, but may be initiated well before the hole-in-one is attempted.

The terms "player," "individual," "contestant," "golfer," "participant" "videographer" or "person" are not meant to limit the scope of the invention to one type of entity, as any entity or individual can also use the present invention. The steps involved in initiating payment, recording the event, placing the unique identification code on the golf ball, submitting the recording, or any other steps, may be performed by one or more than one individual in combination, or alone, that is, the steps are not limited to a single individual performing every step. For example, either the contestant or the videographer may initiate payment, and either the player or the videographer may submit the video. One or both of these individuals may perform some or all of the events in order to receive a prize for accomplishing a hole-in-one.

The terminology used herein is for the purpose of describing particular embodiments only and is not intended to be limiting of the invention. As used herein, the singular forms "a," "an," and "the," are intended to include the plural forms as well, unless the context clearly indicates otherwise. It will be further understood that the terms "comprises" and/or "comprising," or "includes" and/or "including" when used in this specification, specify the presence of stated features, operations, elements, and/or components, but do not preclude the presence or addition of one or more other features, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

From the foregoing description of the preferred embodiments, which have been set forth in considerable detail for the purpose of making a complete disclosure of the present invention, the present invention comprises a system and method for providing and administering a golf hole-in-one contest. It will be apparent to those skilled in the art that numerous changes may be made in such details without departing from spirit and principles of the invention. It should be appreciated that the present invention is capable of being embodied in various other forms without departing from its essential characteristics.

What is claimed is:

1. A method for administering a contest, the method comprising the steps of:
    a) entering a player into a contest upon receiving a request from the player on a portable wireless player device to initiate the contest, wherein the contest involves accomplishing an objective using a sports object;
    b) generating electrically a unique identification code;
    c) transmitting the unique identification code to the wireless portable player device in possession of the player;
    d) receiving a video recording of the player accomplishing the objective within a predetermined timeframe from transmitting the unique identification code to the player, wherein the video recording shows the unique identification code on the sports object before attempting the objective and after accomplishing the objective;
    e) verifying that the player accomplished the objective; and,
    f) awarding a prize to the player for accomplishing the objective.

2. The method of claim 1, wherein the objective is accomplishing a hole-in-one and wherein the sports object is a golf ball.

3. The method of claim 2, wherein the contest is performed on a par-three hole, and wherein a green of the par-three hole is visible from a tee of the par-three hole.

4. The method of claim 2, wherein the predetermined timeframe is ten minutes or less.

5. The method of claim 2, wherein the video recording is a continuous video recording showing the following:
    a) placement of the unique identification code on the golf ball before the player hits the golf ball;
    b) placement of the golf ball on the tee;
    c) the player hitting the golf ball in an attempt to make a hole-in-one;
    d) retrieval of the golf ball from a cup; and,
    e) the unique identification code on the golf ball after the player retrieves the golf ball from the cup.

6. The method of claim 5 wherein the golf ball is a used golf ball having an additional distinctive marking.

7. The method of claim 1, further comprising receiving a document confirming the accuracy of the continuous video recording of the player accomplishing the objective.

8. The method of claim 7, further comprising the step of confirming with a golf course employee that the player was at a golf course at a time of a claimed hole-in-one.

9. The method of claim 1, wherein the video recording is created by a smartphone.

10. The method of claim 1, wherein transmitting the unique identifying code to the player is characterized as transmitting the unique identifying code to an application linked to a smartphone.

11. The method of claim 1, wherein receiving a request to enter the contest is initiated by receiving a payment from the player.

12. The method of claim 1, wherein receiving the continuous video recording is characterized as receiving the continuous video recording wirelessly.

13. The method of claim 1, wherein receiving the continuous video recording is characterized as receiving a live-stream continuous video recording.

14. The method of claim 1, further comprising the step of storing the continuous video recording.

15. The method of claim 1, wherein receiving the request by the player to initiate the contest is characterized as receiving: a) a request to subscribe to the contest for a predetermined time period, and b) receiving a request to attempt more chances at accomplishing the objective, thereby allowing the player to have multiple chances to accomplish the objective.

16. The method of claim 1, wherein the prize is characterized as a progressive jackpot.

17. A method for administering a hole-in-one contest, the method comprising the steps of:
   a) entering a player into a contest upon receiving a request by the player on a portable wireless player device to initiate the contest, wherein the request is initiated by a payment, and wherein the contest involves accomplishing a hole-in-one using a golf ball;
   b) generating electronically a unique identification code;
   c) transmitting the unique identification code to a smartphone;
   d) receiving a video recording of the player accomplishing the hole-in-one within ten minutes of transmitting the unique identifying code to the player, wherein the video is a continuous video recording created by the smartphone, and the continuous video recording shows:
      i) placement of the unique identifying code on the golf ball before the player hits the golf ball,
      ii) placement of the golf ball on the tee,
      iii) the player hitting the golf ball in an attempt to make a hole-in-one,
      iv) retrieval of the golf ball from a cup,
      v) the unique identifying code on the golf ball after the player retrieves the golf ball from the cup verifying that the player accomplished the objective by reviewing the video recording; and,
   e) awarding a prize to the player for accomplishing the objective.

* * * * *